US012427078B2

(12) United States Patent
Xiang

(10) Patent No.: US 12,427,078 B2
(45) Date of Patent: Sep. 30, 2025

(54) STORAGE VESSEL

(71) Applicant: Pencil H Studio LLC, Sacramento, CA (US)

(72) Inventor: Hai Qi Xiang, Walnut, CA (US)

( * ) Notice: Subject to any disclaimer, the term of this patent is extended or adjusted under 35 U.S.C. 154(b) by 32 days.

(21) Appl. No.: 18/295,878

(22) Filed: Apr. 5, 2023

(65) Prior Publication Data

US 2024/0335345 A1 Oct. 10, 2024

(51) Int. Cl.
*A61G 17/08* (2006.01)
*B65D 39/00* (2006.01)

(52) U.S. Cl.
CPC ......... *A61G 17/08* (2013.01); *B65D 39/0023* (2013.01); *B65D 2203/02* (2013.01)

(58) Field of Classification Search
CPC .... A61G 17/08; B65D 39/0023; B65D 39/00; B65D 2203/02; A45C 1/12
USPC .......................................................... D99/5
See application file for complete search history.

(56) References Cited

U.S. PATENT DOCUMENTS

| | | | | | |
|---|---|---|---|---|---|
| 2,235,617 | A * | 3/1941 | Klinzing | A61G 17/08 | 27/1 |
| 2,385,520 | A * | 9/1945 | Klinzing | A61G 17/0076 | 27/1 |
| 2,701,659 | A * | 2/1955 | Baltosser | B65D 39/0023 | 220/804 |
| 3,654,675 | A * | 4/1972 | Peterson | E04H 13/006 | 229/5.5 |
| 5,172,457 | A * | 12/1992 | Allen | A61G 17/08 | 27/1 |
| 5,379,499 | A * | 1/1995 | Jackson | A61G 17/08 | 27/35 |
| 5,647,108 | A * | 7/1997 | Crook | E04H 13/006 | 27/DIG. 1 |
| D385,081 | S * | 10/1997 | Parker | D99/5 | |
| 5,832,575 | A * | 11/1998 | Sturino | A61G 17/08 | 27/1 |
| D445,557 | S * | 7/2001 | Chang | D99/5 | |
| 6,295,705 | B1 * | 10/2001 | Gersten | A61G 17/08 | 220/4.27 |
| 6,389,664 | B1 * | 5/2002 | Wood | A61G 17/08 | 40/124.5 |
| 7,117,570 | B1 * | 10/2006 | Borgerding | A61G 17/007 | 40/124.5 |
| D584,475 | S * | 1/2009 | Mytych | D99/5 | |

(Continued)

FOREIGN PATENT DOCUMENTS

| | | | | |
|---|---|---|---|---|
| DE | 10330124 A1 * | 1/2005 | | A61G 17/08 |

*Primary Examiner* — William L Miller
(74) *Attorney, Agent, or Firm* — Omni Legal Group; Omid E. Khalifeh; Ariana Santoro

(57) ABSTRACT

A storage vessel is provided comprising a vessel body, a vessel plug, and at least one commemorative element. The vessel body has a bottom securely joined to a domed top to define an interior chamber accessible through an opening defined on the bottom. The vessel plug secures the opening and may be obscured during use to disguise the opening. The at least one commemorative element comprises a rod with a star mounted on its distal end, extending off the domed top. The vessel may further comprise an ornamental structure extending off the domed top and an identifier. The vessel may be used as an urn, and the interior chamber may be used to accommodate the remains of loved ones, including small and large pets.

13 Claims, 4 Drawing Sheets

(56) References Cited

U.S. PATENT DOCUMENTS

| | | | | |
|---|---|---|---|---|
| D585,625 | S * | 1/2009 | Gray | D99/5 |
| 9,775,760 | B1 * | 10/2017 | Roy | A61G 17/08 |
| 11,135,116 | B2 * | 10/2021 | Reynolds | A61G 17/08 |
| 11,951,049 | B2 * | 4/2024 | Reynolds | A61G 17/00 |
| 12,329,694 | B1 * | 6/2025 | Bethany | A61G 17/08 |
| 2005/0120525 | A1 * | 6/2005 | Heil | A61G 17/08<br>27/1 |
| 2021/0275377 | A1 * | 9/2021 | Agar | A61G 17/08 |
| 2024/0082093 | A1 * | 3/2024 | Parker | G06F 21/6218 |
| 2024/0143258 | A1 * | 5/2024 | Gills | G06F 3/14 |

* cited by examiner

STORAGE VESSEL

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to storage vessels and, more particularly, to a vessel having at least one commemorative element and an obscured opening.

BACKGROUND

There are many types of vessels that may be used to store various items, including foodstuff, valuables, and even the remains of loved ones. Due to the numerous uses for vessels, various solutions have been proposed to better suit certain vessels to their intended contents. For example, airtight and waterproof vessels have been proposed to improve the shelf-life of many types of foodstuff and other goods that may be harmed if exposed to the elements. Others have proposed vessels designed to disguise their use for storage, creating a covert storage solution. These proposals may overlap, resulting in a variety of multi-purpose vessels that can alternatively address storage needs.

Some exemplary proposals for vessels include U.S. Pat. No. 7,159,736 to Torelli for a container with a lid that blocks the air in the container in order to retain the freshness of its contents; U.S. Patent Publication No. 2019/0185224 to Decarlo for a lockable, leak-proof microwavable container, and U.S. Pat. No. 22,186 to Mason for screw top glass canning jars. It is notable that each of these containers has an opening at the top for permitting access to its content. However, such ready access to its contents may be undesirable in some cases, whether it is to hide valuable contents or to obscure the overall purpose of the vessel. In these situations, alternative designs that comprise hidden or disguised openings may be preferred to prevent unauthorized access to the vessel contents. To that end, some have also proposed disguising vessels as common items, such as stuffed toys, clothing, or ornamental displays. For example, U.S. Patent Publication No. 2006/0292965 to Sayles teaches a stuffed animal with a coin repository hidden inside. Another proposal, U.S. Patent Publication No. 2005/

0284004 to Peters, teaches a shoe with a removable sole that disguises a chamber operative to store items. While these proposals utilize various means to obscure the storage elements, they may be unsuitable for some storage purposes. For example, children are generally forgetful, leaving their stuffed toys in various places, making it easy to lose track of vessels disguised as toys along with any items stored within them. In addition, the shape and size of shoes, generally, severely limits the available space available to store valuables and may be unsuitable for many types of valuables.

One common type of vessel is an urn, which may be used to house the ashes of a loved one following their death. Traditionally, urns have been designed with a rounded base having a tapered neck and a topmost lid, and they are commonly utilized to respectfully honor, store, and protect the ashes of a loved one. However, traditional urns can pose a challenge to respectfully remembering the loved one. In particular, the distinct and sometimes morbid appearance of an urn may be undesired by and even disturbing to many. Thus, many urns may be relegated to an attic, closet, or out-of-the-way shelf even, which can detract from the memory of the loved one. In an attempt to address the issue of how to respectfully remember the loved one, several alternative urns have been proposed. These proposals include U.S. Pat. No. 6,785,938 to Johansen which provides a decorative figure in the likeness of a deceased pet that provides a sealable chamber for holding the remains of such pet, U.S. Pat. No. 9,925,470 to Palacio for plush toy configured to hold an urn within it, and U.S. Patent Publication No. 2015/0264869 to Steiner for a plantable urn. While each of these proposals provides an alternative to traditional urns, there remains a continued need for improvements to non-traditional urns.

Although various proposals have been made to provide different vessels for storage, none of those in existence combine the characteristics of the present invention. Therefore, there is a need for a storage vessel configured to obscure its valuable contents in a secure and respectful manner.

SUMMARY

The present disclosure is directed to a storage vessel that comprises an obscured opening. Specifically, the vessel is configured to store valuables items, including remains of loved ones, in an aesthetically appealing manner that masks its storage function.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the vessel comprises a hollow vessel body, a plug, and at least one commemorative element. The vessel body may have a top and a bottom, each having an inner surface and an outer surface. The bottom is securely joined to the top to define an interior chamber, defined as a space between the inner surfaces of the top and bottom. The bottom may be configured to define an opening in communication with the interior chamber.

The size of the bottom and the top of the vessel body defining the interior chamber may vary in size to permit the storage of variously sized items. It is contemplated that in some embodiments, the vessel may be an urn, and the interior chamber may be sized to contain the remains of a loved one.

The vessel plug may be configured to secure the opening defined by the bottom of the vessel body. In one exemplary embodiment, the plug may comprise an inner flange and an outer flange separated by a neck. When the plug is engaged with the opening, the inner flange may contact the inner surface of the bottom, the outer flange may contact the outer surface of the bottom, and the neck may extend from the outer surface to the inner surface of the bottom. In one embodiment, the inner flange and the outer flange may comprise a greater surface area than the surface area of the opening to prevent the plug from being dislodged when engaged with the opening. In some embodiments, the plug may be constructed from a flexible material to allow the inner flange to pass through the opening, permitting the selective securement of the plug with the opening.

It is contemplated that, when in use, the top of the vessel body may constitute the viewable portion of the vessel and the bottom, and thus the opening and the plug, may be at least partially obscured.

In some embodiments, the vessel commemorative element may comprise a rod extending from the vessel body and an object mounted to a distal end of the rod. The object may be any shape, figure, structure, or item in any combination or number as desired, including, without limitation, a star, a moon, a sun, a cloud, a diamond, a square, a triangle, a circle, an animal, or a human.

In some embodiments, the vessel may additionally comprise an ornamental structure extending from the top of the vessel body. In such embodiments, the rod of the at least one commemorative element may extend from a top portion of the ornamental structure.

In some embodiments, the vessel may comprise an identifier. For example, the identifier may be used to identify, for example, any contents stored in the interior chamber or even the name of an owner of the vessel. In an embodiment where the vessel is used as an urn, the identifier may be used to identify the loved one whose remains are contained within the interior chamber.

The vessel may be formed out of any material as needed or desired, including, without limitation, metal, plastic, wood, ceramic, or any material or combination of materials that may be known to those skilled in the art. In some embodiments, the vessel body, the plug, and the at least one commemorative element may be made out of a combination of materials. It is contemplated that such materials may, however, be water and/or air tight as needed or desired to protect the contents from the elements.

It is an object of the invention to provide a vessel with an obscured opening so that an individual viewing the vessel would not immediately recognize that the vessel comprises an accessible interior chamber.

It is a further object of the invention is to create a customizable vessel.

Another object of the invention is to provide a versatile vessel that may be displayed in a variety of situations without drawing unwanted attention to itself.

Still another object of the invention is to provide an urn that may be commemorative yet does not conjure the same morbid connotations as traditional urns.

One or more of the above-disclosed embodiments, in addition to certain alternatives, are provided in further detail below with reference to the attached figures. The disclosed subject matter is not, however, limited to any particular embodiment disclosed.

Figure 1:
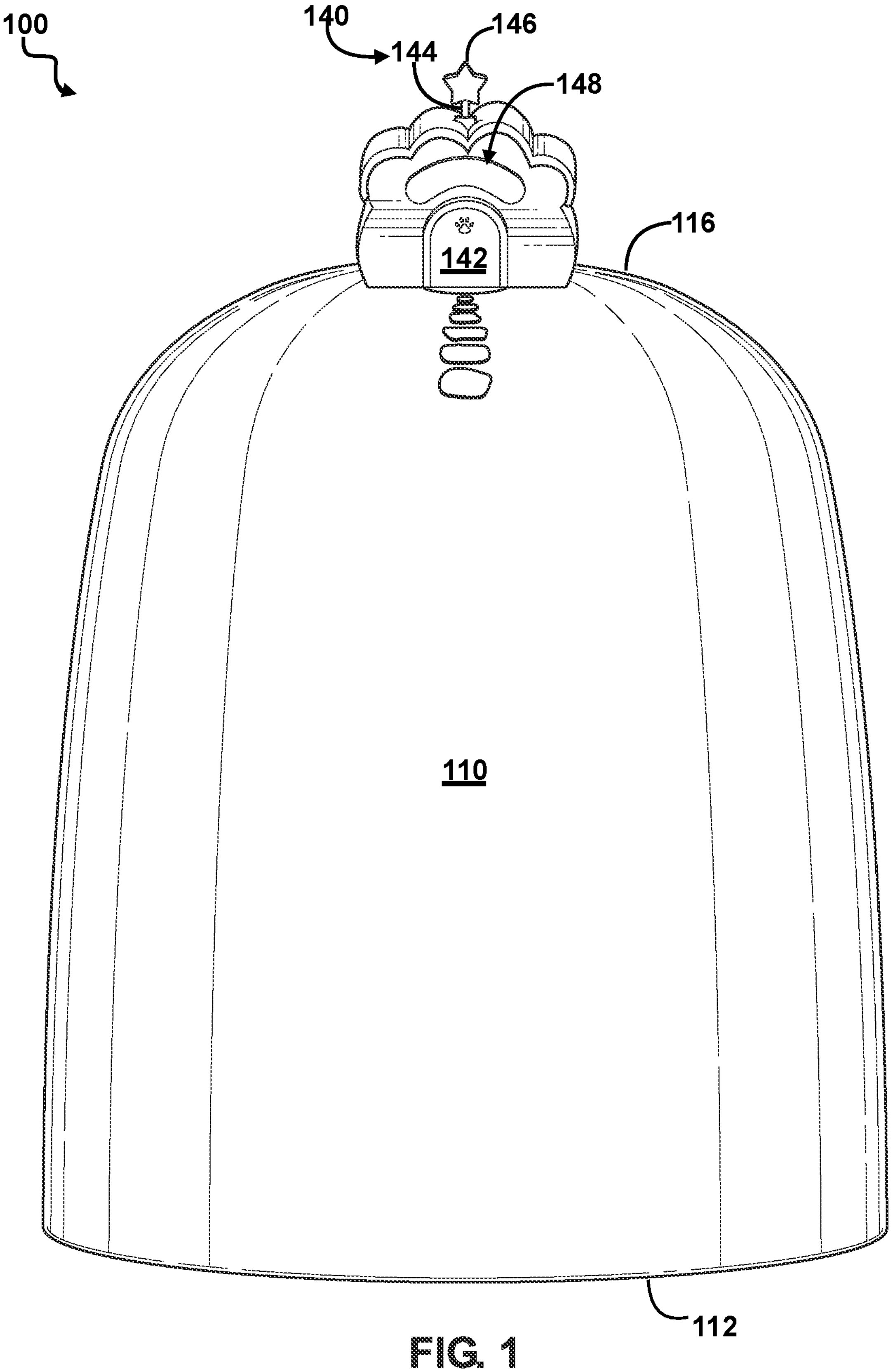
FIG. 1 shows a front view of an embodiment of the vessel.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

Figure 3:
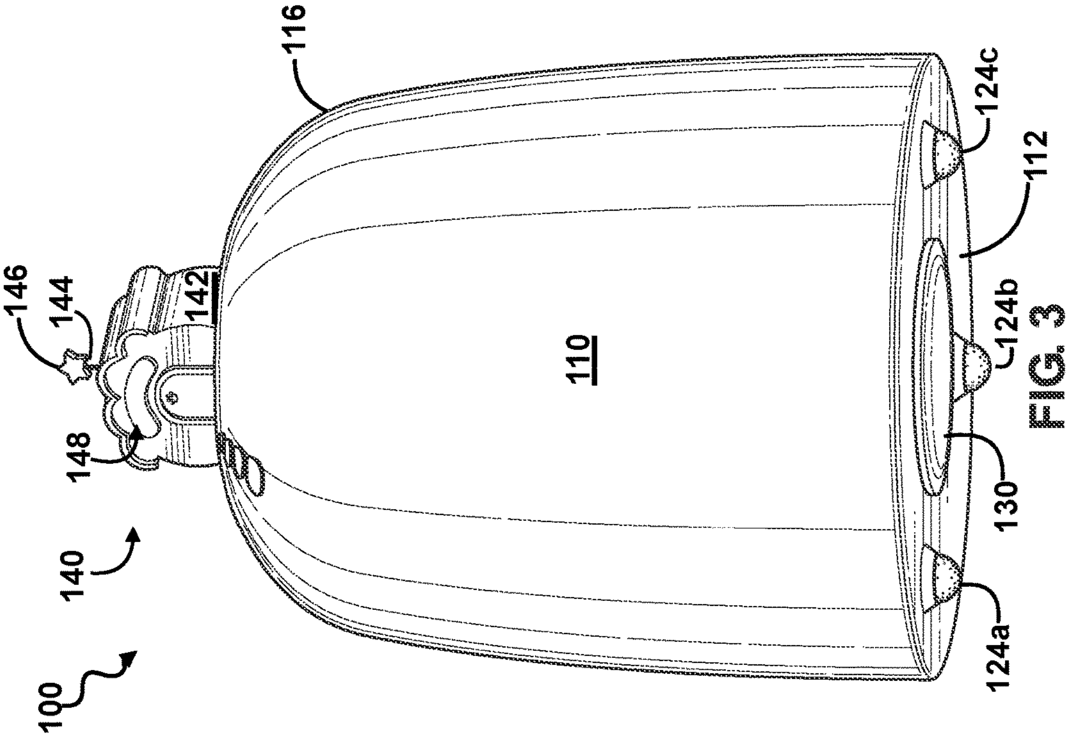
FIG. 3 shows a perspective view of an embodiment of the vessel.
Figure 2:
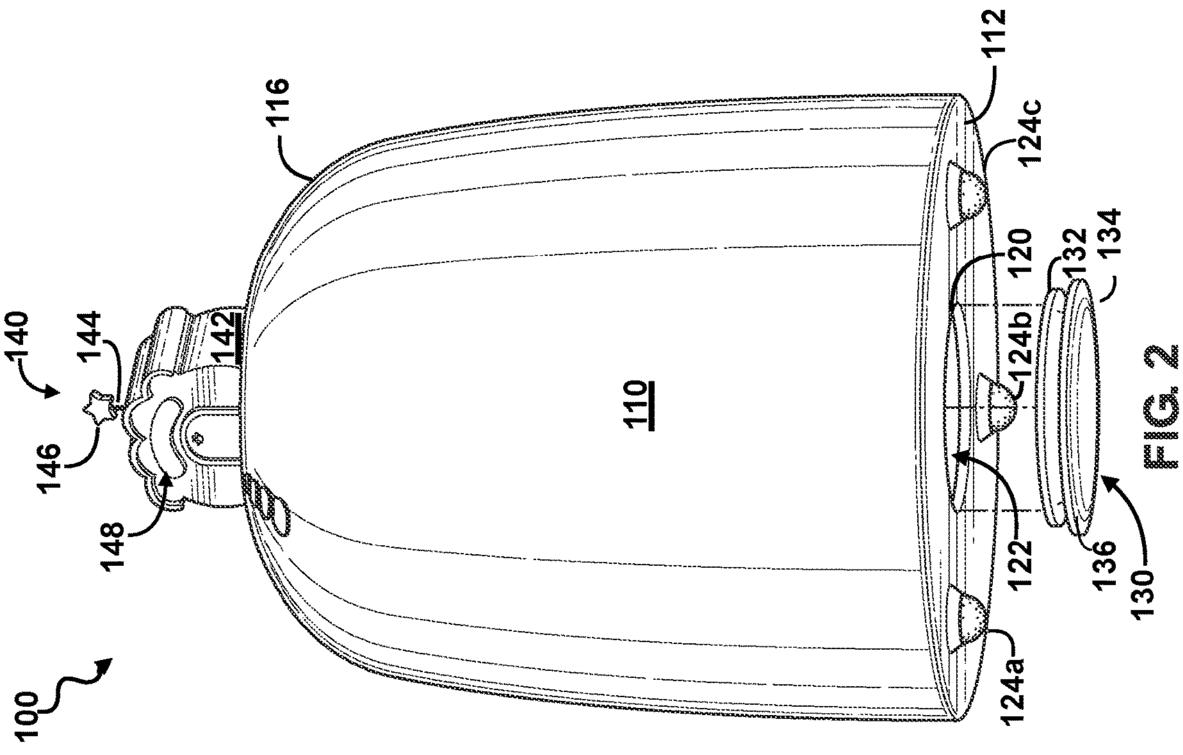
FIG. 2 shows an exploded perspective view of an embodiment of the vessel.

With reference to FIGS. 1-3 an embodiment of a storage vessel 100 may comprise a vessel body 110 and at least one commemorative element 140. The vessel body 110 may be defined by a bottom 112 securely joined to a top 116, each having an inner surface and an outer surface (obscured in the figures). Together, the bottom 112 being securely joined to the top 116 may define an interior chamber 122 configured for storage. In the embodiments shown, the bottom 112 may define an opening 112 in communication with the interior chamber 122.

When in use, the bottom 112 that defines the opening 120 in the vessel 100 may be operative to obscure the opening, effectively disguising the vessel's 100 use for storage. As such, when viewed, the vessel 100 may not be instantly recognized as a storage means. It is noted, however, that in some embodiments, the opening may be located on another portion of the vessel body and, in some instances, may even be visible during use.

As shown in the figures, the top 116 may be domed. Of course, the top 116 does not need to be domed but may instead be a pyramid, a tower, a spire, or any other three-dimensional shape that may be desired.

Figure 5:
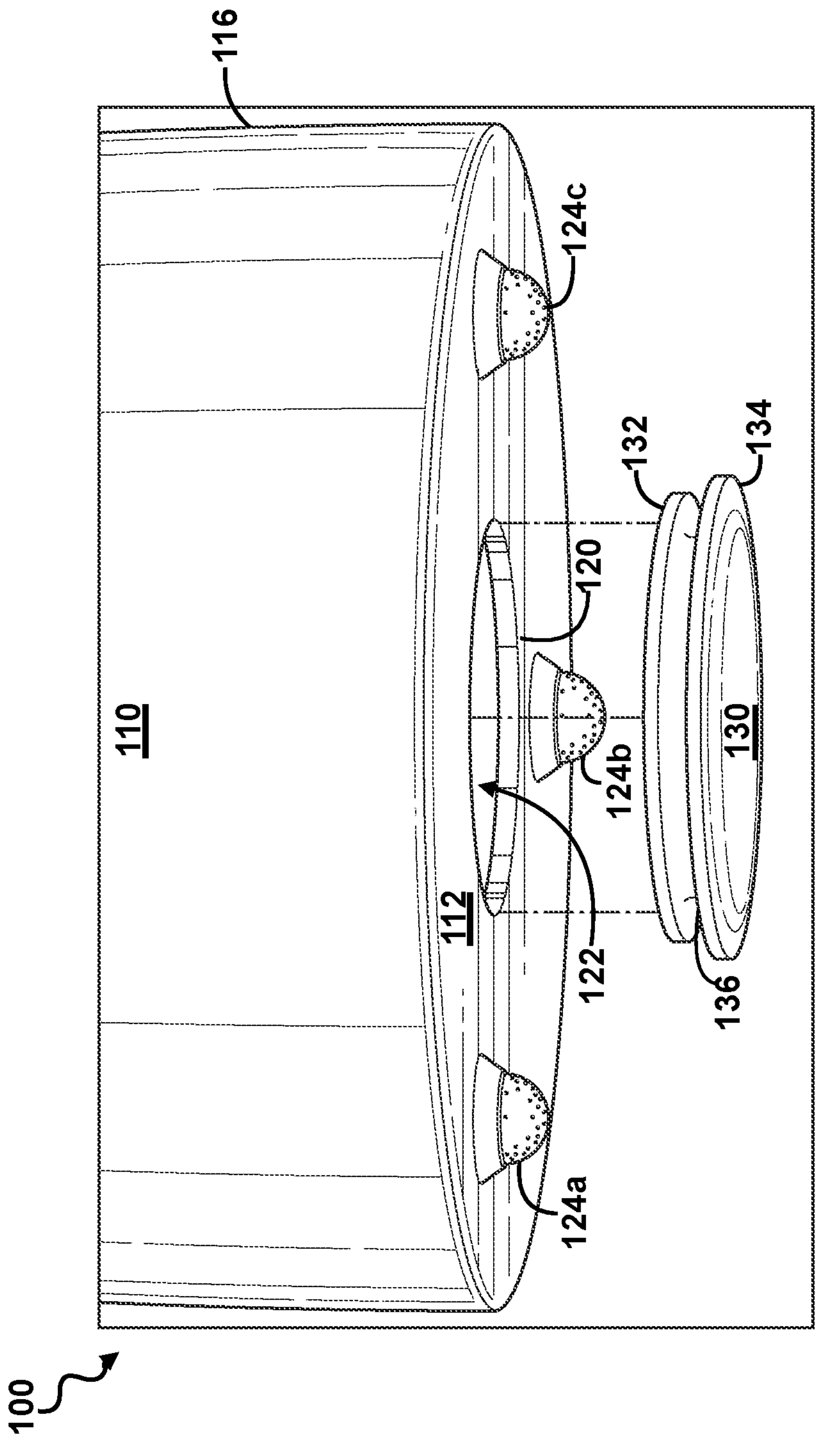
FIG. 5 shows a close-up, exploded view of the bottom of an embodiment of the vessel.

With reference to FIGS. 2 and 5, the bottom 112 and the opening 120 may be circular. More specifically, the bottom 112 and the opening 120 may be concentric circles. Of course, the bottom, or the opening may be another shape, such as a square, rectangle, diamond, or triangle. In some embodiments, not shown, the bottom and the opening may be the same shape. In other embodiments, the bottom and the opening may be different shapes. In yet further embodiments, the opening may be located at any position along the bottom.

In some embodiments, bottom 112 may comprise at least one foot operative to stabilize the vessel 100. In this embodiment, the vessel comprises a first foot 124*a*, a second foot 124*b*, and a third foot 124*c*. Each foot may be uniformly spaced on the bottom 112. Of course, any number or configuration of feet may be utilized, and it is even contemplated that the bottom may not comprise any feet at all. In such embodiments, the bottom may be in direct contact with a surface or may comprise bumpers, or other similar features known to those of ordinary skill in the art.

In some embodiments, and with particular attention to FIG. 3, plug 130 may be operative to secure with the opening 120 defined by the bottom 112 of the vessel 100 in order to prevent access to the interior chamber 122. In one embodiment, the plug 120 securing with the opening 130 to create a water-resistant seal. It is contemplated that the plug 130 may secure with the opening 120 in any manner operative to obstruct the opening 130. Of course, covers, doors, hatches, seals, stoppers, or other securement means, may be provided in lieu of the plug, in order secure with the opening.

With reference to FIGS. 2 and 5, the plug 130 may, in some embodiments, comprise an inner flange 132 and an outer flange 134 larger than the opening 120 disposed on opposite ends of a neck 136 itself sized to fit within the opening 120. The inner flange 132 may be constructed from a flexible material, such as rubber, plastic, silicone, or any other suitable material. It is contemplated that the flexibility of the inner flange 132 may enable the inner flange 132 to be partially folded upon itself to pass through the opening 120. Upon entering the interior chamber 122, the inner flange 132 may then expand to cover the entirety of the opening 120 from the inside of the vessel 100.

In some embodiments, the outer flange 134 may have a larger surface area than the inner flange 132. It is contemplated that in some embodiments, the inner flange has a larger surface area than the outer flange, or in other embodiments, where the plug does not include an inner flange, and the neck is sized for an interference fit with the opening. The inner flange 132 and the outer flange 134 may, in some embodiments, have a greater surface area than the opening 120 in order to prevent inward or outward movement of the plug 120 when secured. The neck 138 may be sized to fit within the opening 120. Indeed, the neck 138 may be sized to prevent lateral movement of the plug 130 when secured. Of course, many configurations of plugs may be used, and the aforementioned embodiments are provided as non-limiting examples.

In some embodiments, the outer flange 134 may also be constructed from a flexible material that allows it to be folded on itself, which allows it to be folded in on itself to facilitate each removal of the neck 136 and inner flange 132 from the opening 120. In one embodiment, the outer flange 134 may be constructed from the flexible material of the inner flange 132. In another embodiment, the inner flange 132 may comprise the same material as the neck 136. For example, the inner flange 132, the outer flange 134, and the neck 136 may each comprise natural or synthetic rubber. Of course, any of the inner flange, outer flange, and the neck may comprise materials different from another. The particular choice of material comprising the plug will not limit the invention.

The interior chamber 122 may be sized in accordance with the intended contents of the vessel 100. For example, when the vessel 100 may be utilized as an urn, and the interior chamber 122 may be sized in order to hold the remains of a loved one. It should be clear that the interior chamber 122 may be provided in any size or shape in order to allow storage in the vessel 100. For instance, coins, snacks, jewelry, and even cash may be stored in the interior chamber.

In one embodiment, the interior chamber 122 may have a volume from about 0.5 cubic inches to about 500 cubic inches. In another embodiment, the interior chamber 122 may have a volume from about 1 cubic inch to about 300 cubic inches. In a further embodiment, the interior chamber 122 may have a volume from about 25 cubic inches to about 200 cubic inches.

Figure 4:
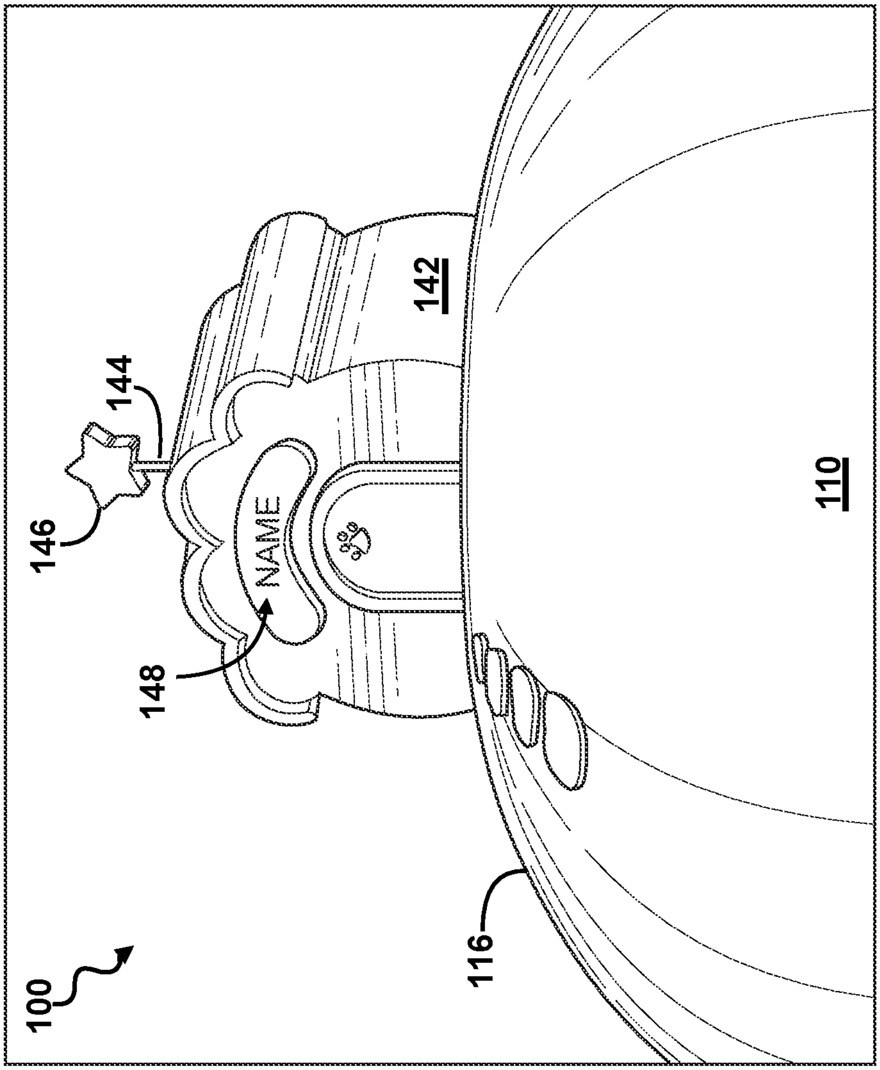
FIG. 4 shows a close-up view of the top of an embodiment of the vessel.

As shown in detail in FIG. 4, the vessel 100 may further comprise an ornamental structure 142, shown as a stylized house extending from the top 112 of the vessel body 110. As shown, the ornamental structure 142 further comprises a walkway leading to a door on the stylized house. Of course, each of these elements may be changed without compromising the spirit of the invention. For example, the ornamental structure may be a tree, boat, car, figurine, or anything other ornamental structure that may be desired.

In some embodiments, the rod 144 may extend from a top portion of the ornamental structure 142 and the star 146 may be located at a distal end of the rod 144, operative to suspend the star 146 above the vessel body 110. Of course, the star 146 is only one of many objects that may be utilized. For example, another shape, such as a circle, square, diamond, a moon, a sun, an animal, a human, or anything else that may be desired. In the interest of brevity, the star is referenced throughout, however, any object may be utilized, and the reference to star should not be considered limiting.

In some embodiments, the rod 144 may be made out of any material suitable to suspend the star 146 above the vessel body 110. In some instances, the rod 144 may be formed out of a rigid material. In one embodiment, the rod may be transparent, such that the star may appear unsupported above the vessel body. In another embodiment, the rod may be formed from a visible material.

The rod is broadly construed as any structure capable of suspending the star, and may, in some embodiments, comprise multiple elements. For example, in some embodiments, the rod may be integral with any portion of the ornamental structure. In another embodiment, the rod and the ornamental structure may be separate elements, with the ornamental structure encompassing any portion of the rod. In a further embodiment, the rod may be affixed to the top portion of the ornamental structure. It should be appreciated that all of these embodiments are considered to fall within the scope of the invention, with the common characteristic being that the rod extends from the top of the vessel to suspend the star.

In certain embodiments, the vessel 100 may comprise an identifier 148. In the embodiment shown in FIG. 4, the identifier 148 is shown as "NAME" which a person of ordinary skill will appreciate is used as a visual placeholder, and any name may be utilized. Of course, the identifier does not need to be a name but may be any word, phrase, or image that is desired.

It is contemplated that the identifier may be personalized as desired. For example, when the vessel is configured as an urn, the identifier may identify a loved one whose remains are stored in the interior chamber of the urn. The identifier may be permanent on the vessel in one embodiment, while it may be removable and changeable in other embodiments.

As shown in FIG. 4, the identifier 148 may be located on the ornamental structure 142. For example, the identifier 148 is shown above a door on the stylized house. Of course, in other embodiments, not shown, the identifier may be located on any portion of the vessel. For example, the identifier may be on the bottom or the top of the vessel body. The identifier may, in another embodiment, be located adjacent to the vessel body, such as attached through a rod or other attachment means.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, the types of contents and shape of the vessel may vary depending on the particular needs and interests of the end user. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Particular terminology used when describing certain features or aspects of the invention should not be taken to imply that the terminology is being refined herein to be restricted to any specific characteristics, features, or aspects of the storage vessel with which that terminology is associated. In general, the terms used in the following claims should not be constructed to limit the storage vessel to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the storage vessel is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the storage vessel.

What is claimed is:

1. A vessel comprising:

a vessel body having a top and a bottom each having an inner surface and an outer surface, the bottom securely joined to the top to define an interior chamber, the bottom configured to define an opening in communication with the interior chamber;

a plug configured to secure the opening;

an ornamental structure extending from the top of the vessel body;

at least one commemorative element comprising a rod extending from a topmost portion of the ornamental structure and a star mounted to a distal end of the rod.

2. The vessel of claim 1, wherein the interior chamber has a volume from about 1 cubic inch to about 300 cubic inches.

3. The vessel of claim 1, wherein the plug comprises an inner flange and an outer flange separated by a neck.

4. The vessel of claim 3, wherein the inner flange is flexible, the inner flange and outer flange are sized to at least span the opening, and the neck is configured to extend through the opening.

5. The vessel of claim 1, further comprising an identifier.

6. The vessel of claim 1, wherein the bottom of the vessel body is circular, and the top is domed.

7. An urn comprising a vessel body having a top and a bottom each having an inner surface and an outer surface, the bottom securely joined to the top to define an interior chamber, the bottom configured to define an opening in communication with the interior chamber;

a plug configured to secure the opening;

an ornamental structure extending from the top of the vessel body;

at least one commemorative element comprising a rod extending from a topmost portion of the ornamental structure and an object mounted to a distal end of the rod.

8. The urn of claim 7, wherein the interior chamber has a volume from about 1 cubic inch to about 300 cubic inches.

9. The urn of claim 7, wherein the plug comprises an inner flange and an outer flange separated by a neck.

10. The urn of claim 9, wherein the inner flange is flexible, the inner flange and outer flange are sized to at least span the opening, and the neck is configured to extend through the opening.

11. The urn of claim 7, further comprising an identifier.

12. The urn of claim 7, wherein the bottom of the vessel body is circular and the top is domed.

13. The urn of claim 7, wherein the object mounted to the distal end of the rod has a design configuration selected from a group consisting of a star, a circle, a square, a moon, a sun, an animal, and a human.

* * * * *